(12) United States Patent
Nordlund et al.

(10) Patent No.: US 9,019,280 B2
(45) Date of Patent: Apr. 28, 2015

(54) AREA-BASED RASTERIZATION TECHNIQUES FOR A GRAPHICS PROCESSING SYSTEM

(75) Inventors: Petri Olavi Nordlund, Lieto (FI); Jukka-Pekka Arvo, Rasio (FI)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 13/189,351

(22) Filed: Jul. 22, 2011

(65) Prior Publication Data

US 2013/0021358 A1    Jan. 24, 2013

(51) Int. Cl.
G06T 15/10 (2011.01)
G06T 15/00 (2011.01)
G06T 1/20 (2006.01)

(52) U.S. Cl.
CPC ........................................ *G06T 1/20* (2013.01)

(58) Field of Classification Search
None
See application file for complete search history.

(56) References Cited

U.S. PATENT DOCUMENTS

| | | | | |
|---|---|---|---|---|
| 5,977,983 A * | 11/1999 | Einkauf et al. | | 345/582 |
| 6,160,557 A * | 12/2000 | Narayanaswami | | 345/422 |
| 6,188,412 B1 * | 2/2001 | Morein | | 345/563 |
| 6,611,264 B1 * | 8/2003 | Regan | | 345/422 |
| 6,697,077 B2 | 2/2004 | Meinds | | |
| 6,731,288 B2 | 5/2004 | Parsons et al. | | |
| 7,522,169 B1 | 4/2009 | Muliadi et al. | | |
| 7,663,634 B2 | 2/2010 | Naoi | | |
| 8,044,951 B1 * | 10/2011 | Brown et al. | | 345/419 |
| 2002/0000992 A1 * | 1/2002 | Meinds | | 345/582 |
| 2004/0012600 A1 * | 1/2004 | Deering et al. | | 345/506 |
| 2005/0066205 A1 | 3/2005 | Holmer | | |
| 2006/0232598 A1 * | 10/2006 | Barenbrug et al. | | 345/582 |
| 2007/0115280 A1 | 5/2007 | Imagire | | |
| 2007/0296725 A1 * | 12/2007 | Steiner et al. | | 345/505 |
| 2008/0094412 A1 | 4/2008 | Jiao et al. | | |
| 2009/0153570 A1 | 6/2009 | Jiao et al. | | |
| 2010/0302246 A1 | 12/2010 | Jiao et al. | | |

FOREIGN PATENT DOCUMENTS

WO    2004086309 A2    10/2004

OTHER PUBLICATIONS

Petri Nordlund, Delay streams for graphics hardware, ACM Transactions on Graphics (TOG)—Proceedings of ACM SIGGRAPH 2003 vol. 22 Issue 3, Jul. 2003 pp. 792-800.*

(Continued)

*Primary Examiner* — David Zarka
*Assistant Examiner* — Jason Pringle-Parker
(74) *Attorney, Agent, or Firm* — Shumaker & Sieffert, P.A.

(57) ABSTRACT

This disclosure describes area-based rasterization techniques that can improve the performance of a graphics processor. The techniques may include selecting a rasterization mode for a graphics primitive from a set of at least two candidate rasterization modes based on a metric indicative of an area of the graphics primitive. The techniques may further include performing, with fixed function scan conversion hardware of the graphics processor, scan conversion for the graphics primitive when a first candidate rasterization mode is selected as the rasterization mode for the graphics primitive. The techniques may further include performing, with a programmable shader unit of the graphics processor, scan conversion for the graphics primitive when a second candidate rasterization mode is selected as the rasterization mode for the graphics primitive.

39 Claims, 7 Drawing Sheets

(56) References Cited

OTHER PUBLICATIONS

International Search Report and Written Opinion—PCT/US2012/045091—ISA/EPO—Oct. 26, 2010, 11 pp.

Kautz, "Hardware Lighting and Shading: a Survey," Computer Graphics Forum, vol. 23, No. 1, Mar. 1, 2004, pp. 85-112.

Yan et al., "Mesh Segmentation Schemes for Error Resilient coding of 3-D Graphic Models," IEEE Transactions on Circuits and Systems for Video Technology, Jan. 2005, vol. 15, No. 1, pp. 138-144 (http://ieeexplore.ieee.org/xpl/freeabs_all.jsp?arnumber=1377370).

International Preliminary Report on Patentability—PCT/US2012/045091, The International Bureau of WIPO—Geneva, Switzerland, Nov. 8, 2013, 18 pp.

Reply to Written Opinion mailed Oct. 26, 2012, from international application No. PCT/US2012/045091, filed Apr. 19, 2013, 10 pp.

\* cited by examiner

AREA-BASED RASTERIZATION TECHNIQUES FOR A GRAPHICS PROCESSING SYSTEM

TECHNICAL FIELD

This disclosure relates to computing devices and, more particularly, to graphics processing techniques for computing devices.

BACKGROUND

Many computing devices utilize a dedicated graphics processing unit (GPU) to render graphics data for display onto a display device. GPUs typically include a highly-parallel graphics processing pipeline that provides more efficient processing of graphics data than a general purpose central processing unit (CPU). The graphics processing pipeline may include a plurality of processing stages. Each of the processing stages may be a fixed function processing stage or a programmable processing stage. One of the fixed function processing stages commonly found in a graphics processing pipeline is the rasterization stage, which includes circuitry to convert a graphics primitive into a set of pixels corresponding to the graphics primitive. The circuitry in the rasterization stage is typically optimized to process large primitives containing hundreds to thousands of pixels.

SUMMARY

This disclosure describes area-based rasterization techniques that can improve the performance of a graphics processor. The graphics processor may include a rasterization mode selector that determines a metric indicative of the area of a graphics primitive to be rendered, e.g., the number of screen pixels covered by a graphics primitive. Based on this metric, the rasterization mode selector may configure the graphics processor to rasterize the primitive according to one of a large primitive rasterization mode or a small primitive rasterization mode. When rasterizing a primitive according to the small primitive rasterization mode, the graphics processor may rasterize small primitives more efficiently than when rasterizing according to the large primitive rasterization mode while still maintaining acceptable quality standards for the rasterization. For example, the small primitive rasterization mode may bypass all or part of the typical fixed function rasterization circuitry used to rasterize large primitives, and instead, use a programmable shader unit to rasterize the small primitives. For large primitives, the small primitive rasterization mode may be less efficient and/or produce a substantially lower quality of rasterization as compared to the large primitive rasterization mode. Therefore, by selectively applying different rasterization techniques to the primitives based on the area of each primitive, the efficiency of the entire rasterization process may be increased without substantially reducing the quality of the resulting image.

In one example, this disclosure describes a method that includes selecting a rasterization mode for a graphics primitive from a set of at least two candidate rasterization modes based on a metric indicative of an area of the graphics primitive. The set of at least two candidate rasterization modes includes a first candidate rasterization mode and a second candidate rasterization mode. The method further includes performing, with fixed function scan conversion hardware, scan conversion for the graphics primitive when the first candidate rasterization mode is selected as the rasterization mode for the graphics primitive. The method further includes performing, with a programmable shader unit of the graphics processor, scan conversion for the graphics primitive when the second candidate rasterization mode is selected as the rasterization mode for the graphics primitive.

In another example, this disclosure describes a graphics processing device that includes a rasterization mode selector configured to select a rasterization mode for a graphics primitive from a set of at least two candidate rasterization modes based on a metric indicative of an area of the graphics primitive. The set of at least two candidate rasterization modes includes a first candidate rasterization mode and a second candidate rasterization mode. The graphics processing device further includes fixed function scan conversion hardware configured to perform scan conversion for the graphics primitive when the first candidate rasterization mode is selected as the rasterization mode for the graphics primitive. The graphics processing device further includes a programmable shader unit configured to perform scan conversion for the graphics primitive when the second candidate rasterization mode is selected as the rasterization mode for the graphics primitive.

In another example, this disclosure describes an apparatus that includes means for selecting a rasterization mode for a graphics primitive from a set of at least two candidate rasterization modes based on a metric indicative of an area of the graphics primitive. The set of at least two candidate rasterization modes includes a first candidate rasterization mode and a second candidate rasterization mode. The apparatus further includes means for performing scan conversion for the graphics primitive, with fixed function scan conversion hardware, when the first candidate rasterization mode is selected as the rasterization mode for the graphics primitive. The apparatus further includes means for performing scan conversion for the graphics primitive, with a programmable shader unit, when the second candidate rasterization mode is selected as the rasterization mode for the graphics primitive.

In another example, this disclosure describes a computer-readable storage medium that includes instructions that cause one or more processors to select a rasterization mode for a graphics primitive from a set of at least two candidate rasterization modes based on a metric indicative of an area of the graphics primitive. The computer-readable storage medium further includes instructions that cause one or more processors to perform scan conversion for the graphics primitive, with fixed function scan conversion hardware of the graphics processor, when the first candidate rasterization mode is selected as the rasterization mode for the graphics primitive. The computer-readable storage medium further includes instructions that cause one or more processors to perform scan conversion for the graphics primitive, with a programmable shader unit of the graphics processor, when the second candidate rasterization mode is selected as the rasterization mode for the graphics primitive.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
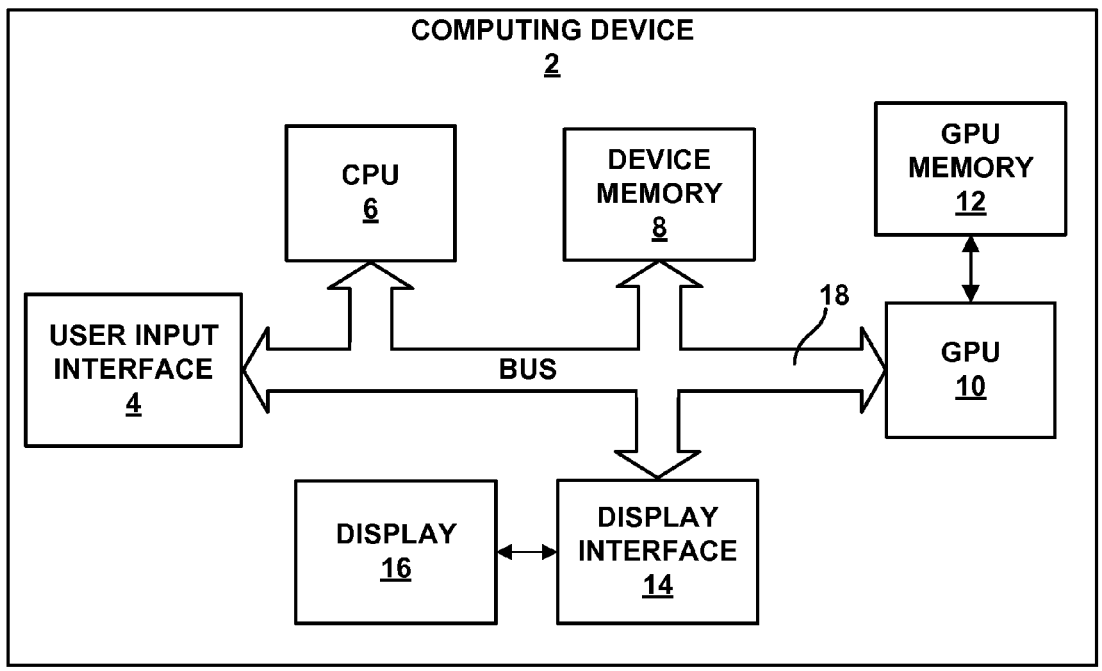
FIG. 1 is a block diagram illustrating an example computing device that performs the area-based rasterization techniques in accordance with this disclosure.

This disclosure describes area-based rasterization techniques that can improve the performance of a graphics processor. The graphics processor may include a rasterization mode selector that determines a metric indicative of the area of a graphics primitive to be rendered, e.g., the number of screen pixels covered by a graphics primitive. Based on this metric, the rasterization mode selector may configure the graphics processor to rasterize the primitive according to one of a large primitive rasterization mode or a small primitive rasterization mode. When rasterizing a primitive according to the small primitive rasterization mode, the graphics processor may rasterize small primitives more efficiently than when rasterizing according to the large primitive rasterization mode while still maintaining acceptable quality standards for the rasterization. For example, the small primitive rasterization mode may bypass all or part of the typical fixed function rasterization circuitry used to rasterize large primitives, and instead, use a programmable shader unit to rasterize the small primitives. For large primitives, the small primitive rasterization mode may be less efficient and/or produce a substantially lower quality of rasterization as compared to the large primitive rasterization mode. Therefore, by selectively applying different rasterization techniques to the primitives based on the area of each primitive, the efficiency of the entire rasterization process may be increased without substantially reducing the quality of the resulting image.

Modern graphics processing units (GPUs) may include fixed function rasterization circuitry that is configured to efficiently rasterize large primitives that include hundreds or thousands of pixels. A primitive may be defined by the vertices of a polygon, such as, e.g., the vertices of a triangle. Rasterization, as used herein, may refer to the process of converting a vertex representation of a graphics primitive into a fragment representation, e.g., a pixel representation of the graphics primitive. For example, a primitive may be rasterized to produce pixels generally within an area defined by the vertices of the primitive. The fixed function rasterization circuitry may include fixed function primitive setup hardware and fixed function scan conversion hardware, which together may be used to determine which fragments or pixels are "covered" by the primitive to be rasterized. The primitive setup hardware, e.g., triangle setup hardware, may calculate differentials, edge functions, plane equations and/or other data that is used by the scan conversion hardware to traverse the primitive. The scan conversion hardware may execute a primitive traversal algorithm using the data provided by the primitive setup hardware to determine which fragments are covered by the primitive. The fixed function rasterization circuitry may also include fixed function attribute interpolation hardware, which may determine color values and other attributes values for each fragment based on the attribute values of the vertices of the primitive.

In some instances, a graphics application may need to render a plurality of small primitives. These primitives, typically triangles and/or quadrilaterals, may be less than or equal to approximately one screen pixel in size. Such primitives may result from, for example, dense polygon meshes created by an artist to capture the fine surface detail in an object to be modeled in a graphics scene. Small primitives may also be the result of tessellating a coarse polygon mesh into small polygons with displacement mapping to show the fine detail in modeled objects. The fixed function rasterization circuitry described above, however, may render these small primitives in an inefficient manner. For example, the primitive setup operations, primitive traversal algorithms and/or the attribute interpolation algorithms performed for large primitives may not need to be performed for small primitives, or at the very least, more efficient versions for one or more of the algorithms may be able to be performed for such primitives.

A GPU designed in accordance with this disclosure may render small primitives according to a small primitive rasterization mode that is configured to rasterize small primitives in a more efficient manner. For example, for small triangles, e.g., triangles having an area less than or equal to approximately one pixel, the vertices of the triangle and all interior portions of the triangle may map to a single screen pixel. In such examples, a scan conversion algorithm may not need to perform complex edge walking algorithms or triangle traversal algorithms, which are typically performed when rasterizing large triangles, in order to determine which pixels are covered by the triangle. Because the triangle traversal algorithms do not need to be performed for such primitives, all or part of the triangle setup operations typically performed when rasterizing large triangles may also not need to be performed for the triangle. In such examples, the small primitive rasterization mode may effectively bypass one or both of the triangle setup hardware and the scan conversion hardware in the fixed function rasterization circuitry.

In additional examples, complex attribute interpolation calculations may not need to be performed for small triangles, e.g., triangles having areas less than or equal to approximately one screen pixel. Rather, in some instances, one of the vertices of the triangle may be selected, and the attributes for the selected vertex may be used as the attributes for a single fragment associated with the small triangle. In other instances, the attribute values for the fragment may be interpolated based on the attribute values of the triangle vertices, but the interpolation algorithm may be simpler and more efficient than the interpolation algorithm used in the attribute interpolator hardware of the fixed function rasterization circuitry. In each of these examples, the small primitive rasterization mode may effectively bypass the attribute interpolator hardware in the fixed function rasterization circuitry.

Although a graphics processor designed in accordance with this disclosure may bypass one or more components of the fixed function rasterization circuitry when rasterizing according to the small primitive rasterization mode, it still may be desirable, in some cases, to perform one or more rasterization operations in place of those which are performed by the bypassed fixed function components. To that end, a programmable shader unit, e.g., a fragment shader program executing on a fragment shader unit or a unified shader unit, may be used to perform one or more rasterization operations for the graphics processor when rasterizing according to the small primitive rasterization mode. For example, the shader unit may perform scan conversion for the small triangle, e.g., convert a vertex representation of the triangle to a fragment representation of the triangle. For small triangles, the scan conversion performed by the shader unit may be less complex and/or more efficient than the scan conversion performed by the scan conversion hardware in the fixed function rasterization circuitry. As another example, the shader unit may generate attribute values for the fragments covered by the triangle based on the attribute values associated with the vertices of the triangle. Again, for small triangles, the algorithm executed by the shader unit for the generation of the fragment attribute values may be less complex and/or more efficient than the attribute interpolation algorithm implemented by the fixed function rasterization circuitry. By performing some or all of the small primitive rasterization techniques in the shader unit, the rasterization efficiency of the graphics processor may be increased without necessarily needing to add additional fixed function hardware dedicated to the performance of such techniques.

As discussed above, the techniques in this disclosure may improve the rasterization efficiency for small primitives by providing a separate small primitive rasterization mode that eliminates one or more of the rasterization steps typically performed by the fixed function rasterization circuitry and/or replaces one or more steps of the fixed function rasterization circuitry with other steps that are less complex and/or more efficient for smaller primitives. In addition to improvements in the efficiency of the rasterization algorithm itself, the techniques of this disclosure may provide further efficiency improvements by exploiting the parallelism of the fragment shader. In particular, a fragment shader unit may include a plurality of processing elements each configured to execute a shader program in parallel with the other processing elements. For example, the fragment shader unit may include a parallel single instruction, multiple data (SIMD) pipeline typically found in modern GPUs. By performing one or more rasterization operations for small primitives within a fragment shader unit, the small primitive rasterization mode may be able to use the multiple processing elements to rasterize multiple small fragments in parallel, thereby further improving the rasterization efficiency for small primitives.

The techniques discussed above for the rasterization of small primitives may not produce acceptable results, in terms of perceptual quality, for the rasterization of large primitives. Therefore, a GPU designed in accordance with the techniques of this disclosure may include a rasterization mode selector that selects either a large primitive rasterization mode or a small primitive rasterization mode based on a metric indicative of the area of the graphics primitive to be rasterized. In this manner, the rasterization throughput of the GPU may be improved for small primitives without sacrificing quality standards for the rasterization of large primitives.

FIG. 1 is a block diagram illustrating an example computing device 2 that performs area-based rasterization techniques in accordance with this disclosure. Computing device 2 may comprise a personal computer, a desktop computer, a laptop computer, a computer workstation, a video game platform or console, a mobile telephone such as, e.g., a cellular or satellite telephone, a mobile telephone, a landline telephone, an Internet telephone, a handheld device such as a portable video game device or a personal digital assistant (PDA), a personal music player, a video player, a display device, a television, a television set-top box, a server, an intermediate network device, a mainframe computer or another type of device that outputs graphical information.

As illustrated in the example of FIG. 1, computing device 2 includes a user input interface 4, a CPU 6, a device memory 8, a GPU 10, a GPU memory 12, a display interface 14 and a display 16. User input interface 4, CPU 6, device memory 8, GPU 10 and display interface 14 may communicate with each other using a bus 18. Bus 18 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect.

CPU 6 may comprise a general-purpose or a special-purpose processor that controls operation of computing device 2. A user may provide input to computing device 2 to cause CPU 6 to execute one or more software applications. The software applications that execute on CPU 6 may include a word processor application, an email application, a spread sheet application, a media player application, a video game application, a graphical user interface application or another end-user program. The user may provide input to computing device 2 via one or more input devices (not shown) such as a keyboard, a mouse, a microphone, a touch pad or another input device that is coupled to computing device 2 via user input interface 4.

CPU 6 may issue one or more graphics rendering commands or instructions to GPU 10 to cause GPU 10 to render a graphics primitive. CPU 6 may issue graphics rendering commands in accordance with an application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API.

Device memory 8 may store device configuration information that may be used at start-up or reset to configure computing device 2. Device memory may also store data and/or program modules or instructions that are immediately accessible and/or presently being operated on by CPU 6. Device memory 8 may additionally store information from other components of computing device 2, such as information output by GPU 10. Device memory 8 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 10 may be configured to perform graphics operations to render one or more graphics primitives to display 16. Thus, when one of the software applications executing on CPU 6 requires graphics processing, CPU 6 provides the graphics information, e.g., primitive information, to GPU 10 for rendering to display 16. GPU 10 may, in some instances, be built with a parallel structure that provides more efficient processing of complex graphic-related operations than CPU 6. For example, GPU 10 may include a plurality of processing elements that are configured to operate on multiple vertices or fragments in a parallel manner. The highly parallel nature of GPU 10 may, in some instances, allow GPU 10 to draw two-dimensional (2D) and/or three-dimensional (3D) graphics scenes onto display 16 more quickly than drawing the scenes directly to display 16 with CPU 6.

As part of the rendering process, GPU 10 may be configured to rasterize the graphics primitive to produce one or more screen pixels corresponding to the primitive. Rasterization may refer to the conversion of the graphics primitive from a vertex representation of the graphics primitive to a screen pixel representation of the graphics primitive. According to this disclosure, GPU 10 may be configured to rasterize a primitive in accordance with one of at least two different rasterization modes depending on the area of the primitive to be rasterized. For example, GPU 10 may be configured to rasterize relatively large primitives according to a large primitive rasterization mode, and to rasterize relatively small primitives according to a small primitive rasterization mode.

A rasterization mode selector may classify the primitives as either large primitives or small primitives based on a metric indicative of the area of the primitive to be rasterized, and select a rasterization mode corresponding to the classification. The small primitive rasterization mode may be more efficient at rasterizing small primitives than the large primitive rasterization mode. However, for large primitives, the small primitive rasterization mode may be less efficient than and/or produce a substantially lower quality of rasterization than the large primitive rasterization mode. Therefore, by selectively rasterizing according to different rasterization modes based on primitive area, the throughput of GPU 10 may be increased without substantially reducing the quality of the resulting image.

In some examples, GPU may include fixed function scan conversion hardware configured to perform a scan conversion algorithm and a programmable shader unit configured to execute a scan conversion program. In such examples, GPU 10 may be configured to select a rasterization mode from a set of at least two candidate rasterization modes based on a metric indicative of an area of a graphics primitive. The set of at least two candidate rasterization modes comprising a first candidate rasterization mode and a second candidate rasterization mode. When the first candidate rasterization mode is selected as the rasterization mode for the graphics primitive, GPU 10 may use the fixed function scan conversion hardware to perform scan conversion for the graphics primitive. When the second candidate rasterization mode is selected as the rasterization mode for the graphics primitive, GPU 10 may execute the scan conversion program on the programmable shader unit to perform scan conversion for the graphics primitive.

The scan conversion program that is executed on the programmable shader unit may be able to perform scan conversion for small primitives more efficiently that the fixed function scan conversion hardware. For example, the programmable shader unit may be able to scan convert multiple small primitives in parallel. In addition, for some primitives, such as, e.g., primitives that are less than or equal to approximately one screen pixel in size, the scan conversion program may not need to execute one or more of the setup calculations and/or traversal algorithms, e.g., line walking or edge walking algorithms, that a hardware-based rasterizer may execute for large polygons. In this manner, the area-based rasterization techniques may be able to improve primitive throughput in GPU 10.

GPU 10 may, in some instances, be integrated into a motherboard of computing device 2. In other instances, GPU 10 may be present on a graphics card that is installed in a port in the motherboard of computing device 2 or may be otherwise incorporated within a peripheral device configured to interoperate with computing device 2. GPU 10 may include one or more processors, such as one or more microprocessors, application specific integrated circuits (ASICs), field programmable gate arrays (FPGAs), digital signal processors (DSPs), or other equivalent integrated or discrete logic circuitry.

GPU 10 may be directly coupled to GPU memory 12. Thus, GPU 10 may read data from and write data to GPU memory 12 without using bus 18. In other words, GPU 10 may process data locally using a local storage, instead of off-chip memory. This allows GPU 10 to operate in a more efficient manner by eliminating the need of GPU 10 to read and write data via bus 18, which may experience heavy bus traffic. In some instances, however, GPU 10 may not include a separate memory, but instead utilize device memory 8 via bus 18. GPU memory 12 may be one or more volatile or non-volatile memory or storage device, such as random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 10 may provide image information to display interface 14 for presentation via display 16. In the case of 2D and 3D graphics, the image information is typically generated by GPU 10 for display 16. Display 16 may comprise a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 16 may be integrated within computing device 2. For instance, display 16 may be a screen of a mobile telephone. Alternatively, display 16 may be a stand-alone device coupled to computer device 2 via a wired or wireless communications link. For instance, display 16 may be a computer monitor or flat panel display connected to a personal computer via a cable or wireless link.

When one of the software applications executing on CPU 6 desires to display a 2D or 3D graphics image on display 16, CPU 6 and GPU 10 may operate together to render the graphics to display 16. For example, the software application executing on CPU 6 may execute instructions that define one or more graphics objects within a model space or world space for the application. CPU 6 may then execute instructions to tessellate the object into a number of graphics primitives. After obtaining the graphics primitives associated with a modeled object, CPU 6 may issue one or more instructions to GPU 10 to render the graphics primitives associated with the graphics object. For example, CPU 6 may issue one or more instructions to GPU 10 that include vertex specification information, e.g., information that specifies one or more vertices associated with the primitive to be rendered information. The vertex specification information may include vertex positional coordinates and, in some instances, other attributes associated with a vertex, such as, e.g., color coordinates, normal vectors, and texture coordinates. CPU 6 may also issue one or more instructions to GPU 10 that include primitive type information, e.g., information that specifies the type of primitive to be rendered and/or how the vertices are combined to form a primitive.

In some examples, the primitives may be triangle primitives. However, any other type of primitive or combination of primitive types may be used, including, e.g., points, line strips, line loops, separate lines, triangle strips, triangle fans, separate triangles, quadrilateral strips, separate quadrilaterals, or other types of primitives. The term primitive, as used in this disclosure, may be alternatively referred to as a polygon.

After receiving the primitive information, GPU 10 performs geometry processing on the primitive, rasterizes the primitive to generate a pixel representation of the primitive, performs pixel processing on the primitive, and outputs the final screen pixels to the frame buffer of display 16. In accordance with this disclosure, prior to rasterizing the primitive, GPU 10 determines a metric indicative of the area of the primitive to be rasterized, and selects one of at least two different candidate rasterization techniques based on the area metric. GPU 10 then rasterizes the primitive according to the selected rasterization technique.

The computing device 2 illustrated in FIG. 1 is merely one example of the components and architecture of a computing device that may implement the area-based rasterization techniques of this disclosure. In other examples, computing device 2 may contain the same or different components in the same or different architectural configuration.

Figure 2:
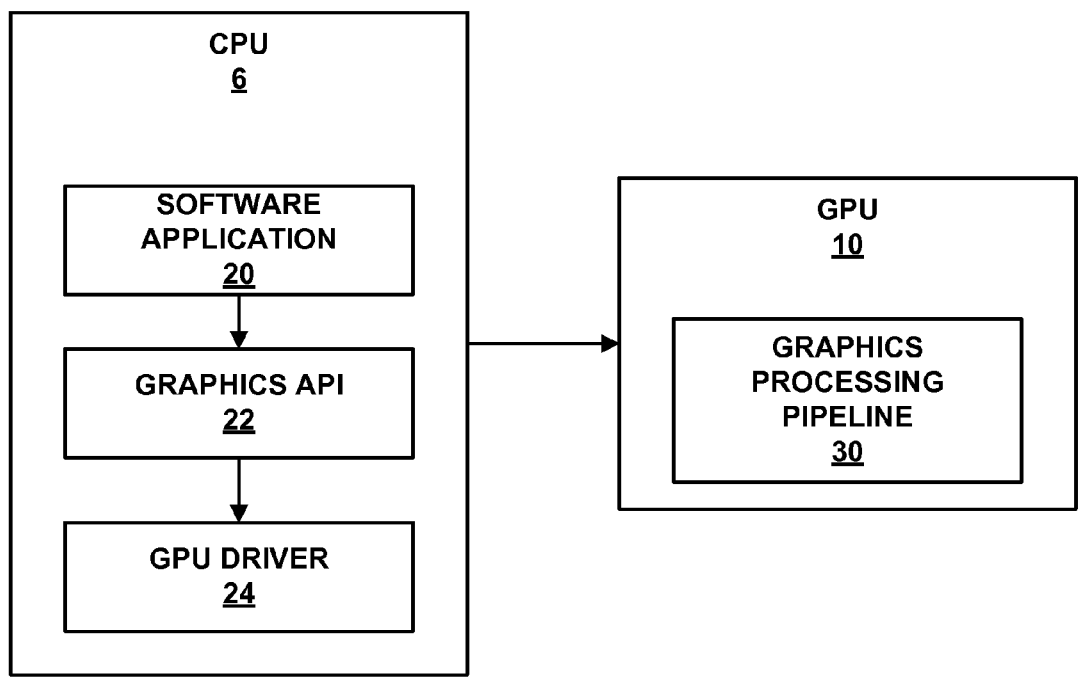
FIG. 2 is a block diagram illustrating the CPU and the GPU of the computing device in FIG. 1 in further detail.

FIG. 2 is a block diagram illustrating CPU 6 and GPU 10 of FIG. 1 in further detail. CPU 6 includes at least one software application 20 executing on CPU 6. Software application 20 may be, for example, a video game application, a graphical user interface application, a portable mapping application, a computer-aided design program for engineering or artistic applications or another type of software application that uses 2D or 3D graphics.

Software application 20 may include one or more instructions that define graphics primitives to be rendered by GPU 10. The one or more instructions may, collectively, define all or part of a graphics scene that includes one or more graphics objects within a model space or world space for the application. Software application 20 may invoke GPU driver 24, via graphics API 22, to issue one or more commands to GPU 10 for rendering one or more graphics primitives into displayable graphics images. For example, software application 20 may invoke GPU driver 24, via graphics API 22, to provide primitive definitions to GPU 10. In some instances, the primitive definitions may be provided to GPU 10 in the form of a list of drawing primitives, e.g., triangles. The primitive definitions may include vertex specifications that specify one or more vertices associated with the primitive to be rendered. The vertex specifications may include positional coordinates for the vertex and, in some instances, other attributes associated with the vertex, such as, e.g., color coordinates, normal vectors, and texture coordinates. The primitive definitions may also include primitive type information, scaling information for the primitive, rotation information for the primitive, and the like. Based on the commands issued by software application 20 to GPU driver 24, GPU driver 24 may formulate one or more commands that specify one or more operations for GPU 10 to perform in order to render the primitive. When GPU 10 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to a frame buffer associated with a display device.

GPU driver 24 may be configured to compile one or more shader programs, and to download the compiled shader programs onto one or more programmable shader units contained within GPU 10. The shader programs may be written in a high level shading language, such as, e.g., the OpenGL Shading Language (GLSL), High Level Shading Language (HLSL), or C for Graphics (Cg) shading language. The compiled shader programs may include one or more instructions that control the operation of a programmable shader unit within GPU 10. For example, the shader programs may include vertex shader programs that control the execution of a programmable vertex shader unit or a unified shader unit. The vertex shader programs may include instructions that specify one or more per-vertex operations. The shader programs may also include fragment shader programs that control the execution of a programmable fragment shader unit or a unified shader unit. The fragment shader programs may include instructions that specify one or more per-fragment operations. In accordance with this disclosure, the fragment shader programs may also include instructions that selectively perform one or more rasterization operations on a primitive in addition to or in lieu of the rasterization performed by the fixed function rasterizer.

Figure 3:
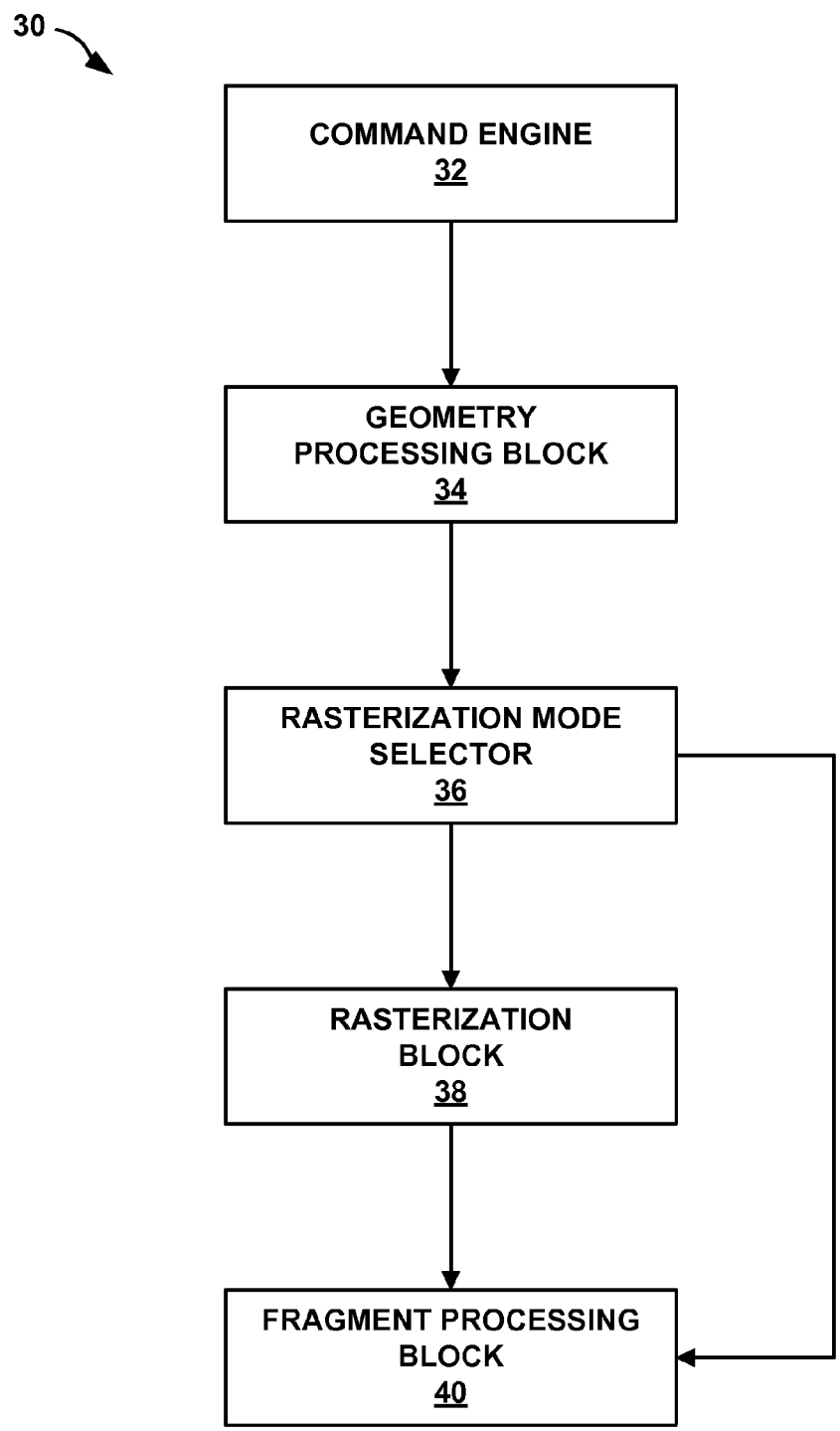
FIG. 3 is a functional block diagram illustrating an example graphics processing pipeline that may be used to implement the area-based rasterization techniques of this disclosure.

FIG. 3 is a functional block diagram illustrating an example graphics processing pipeline 30 that may be used to implement the area-based rasterization techniques of this disclosure. In some instances, graphics processing pipeline 30 may be an example of graphics processing pipeline 30 illustrated in FIG. 2. Graphics processing pipeline 30 is configured to receive one or more graphics processing commands from a CPU, via a graphics driver, and to execute the graphics processing commands to generate displayable graphics. Graphics processing pipeline 30 includes a plurality of graphics processing stages that operate together to execute the graphics processing commends. As shown in FIG. 3, the example graphics processing pipeline 30 includes a command engine 32, a geometry processing block 34, a rasterization mode selector 36, a rasterization block 38 and a fragment processing block 40.

Command engine 32 may receive graphics processing commands and configure the remaining processing stages within command engine 32 to perform operations for carrying out the graphics processing commands. The graphics processing commands may include, for example, vertex commands and primitive type commands. The vertex commands may specify positional coordinates for one or more vertices and, in some instances, other attribute values associated with each of the vertices, such as, e.g., color coordinates, normal vectors, texture coordinates and fog coordinates. The primitive type commands may include information that specifies the type of primitive to be rendered and/or how the vertices are combined to form a primitive. The graphics processing commands may also include transformation commands that specify the types of transformations to perform on the vertices. The graphics processing commands may also include lighting commands that specify the type, direction and/or placement of different lights within a graphics scene. Command engine 32 may generate primitive information based on graphics processing commands and provide the primitive information to geometry processing block 34 for further processing. The primitive information may include, for example, vertex positional coordinates, vertex attribute values, primitive type information and/or transformation specification information.

Geometry processing block 34 is configured to receive primitive information from command engine 32 and to generate processed primitive information based on received primitive information. The processed primitive information may include, for example, modified vertex positional coordinates, processed vertex attribute values and/or the primitive type information. Geometry processing block 34 provides the processed primitive information to rasterization mode selector 36 for further processing. The information contained within processed primitive information may specify a vertex representation of a primitive to be rasterized by further stages of graphics processing pipeline 30.

Geometry processing block 34 may perform one or more transformations on the vertex position coordinates that are included within the primitive information to produce modified vertex positional coordinates that are included within the processed primitive information. For example, geometry processing block 34 may apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing block 34 may also perform per-vertex lighting operations on the vertices to generate modified color coordinates for the vertices. Geometry processing block 34 may also perform other operations including, e.g., normal transformations, normal normalization operations, view volume clipping, homogenous division and/or backface culling operations.

Rasterization mode selector 36 is configured to determine a metric indicative of the area of a graphics primitive to be rasterized. Based on this metric, rasterization mode selector 36 may select a rasterization mode from a set of at least two different candidate rasterization modes for rasterizing the primitive. For example, rasterization mode selector 36 may select between a large primitive rasterization mode and a small primitive rasterization mode based on the metric indicative of the area of the graphics primitive.

The metric indicative of the area of the graphics primitive may be indicative of the area of the graphics primitive in terms of screen pixels. In other words, the metric may be indicative of the number of screen pixels covered by the primitive. The metric indicative of the area of the graphics primitive may, in some examples, be equal to and/or directly represent the area of the graphics primitive in terms of screen pixels. In further examples, the metric indicative of the area may be equal to the double-area of a triangle graphics primitive, i.e., two times the area of the graphics primitive. The metric indicative of the area of the primitive may be referred to alternatively as an area metric.

Rasterization mode selector 36 may, in some cases, determine the metric indicative of the area of the graphics primitive in terms of screen pixels based on vertex positional coordinates associated with the graphics primitive to be rendered according to known techniques. In additional cases, rasterization mode selector 36 may generate a bounding box around a triangle primitive and determine the metric based on the area of the bounding box in order to approximate the area of the triangle primitive. In such examples, the metric indicative of the area of the primitive may be a metric indicative of the bounding boxed formed around the primitive. The bounding box may be screen-space axle oriented, or a general quadrilateral.

In some examples, graphics processing pipeline 30 may rasterize a batch of primitives (e.g., a plurality of primitives) as part of a single rasterization pass. In such examples, rasterization mode selector 36 may, in some implementations, select a rasterization mode for the batch of graphics primitives from a set of at least two candidate rasterization modes based on a metric indicative of an area of at least one graphics primitive in the batch of graphics primitives. In some cases, the metric indicative of the area of the at least one graphics primitive in the batch of graphics primitives may be a single metric indicative of the area of at least two different graphics primitives in the batch of graphics primitives. In additional cases, the metric indicative of the area of the at least one graphics primitive in the batch of graphics primitives may be a single metric indicative of the area of all of the graphics primitives in the batch of graphics primitives, e.g., a metric indicative of whether the area of all of the graphics primitives in the batch of graphics primitives is less than a threshold and/or a metric indicative of whether the average area of the graphics primitives is less than a threshold.

In further examples, graphics processing pipeline 30 may select a rasterization mode for all or a subset of the primitives associated with an object to be rendered from a set of at least two candidate rasterization modes based on a metric indicative of an area of at least one graphics primitive associated with the object to be rendered. The object to be rendered may be a model space object or a world space object defined by a software application executing on the CPU. In some cases, the metric indicative of the area of the at least one graphics primitive associated with the object to be rendered may be a single metric indicative of the area of at least two different graphics primitives associated with the object to be rendered. In additional cases, the metric indicative of the area of the at least one graphics primitive in the batch of graphics primitives may be a single metric indicative of the area of all of the graphics primitives associated with the object to be rendered, e.g., a metric indicative of whether the area of all of the graphics primitives associated with the object to be rendered is less than a threshold and/or a metric indicative of whether the average area of the graphics primitives is less than a threshold.

Rasterization mode selector 36 may configure one or more downstream processing stages, e.g., rasterization block 38 and/or fragment processing block 40, to rasterize the graphics primitive according to the selected rasterization mode. For example, if the large primitive rasterization mode is selected, rasterization mode selector 36 may provide the processed primitive information to rasterization block 38 for rasterization and instruct fragment processing block 40 to not perform rasterization operations for the primitive. Otherwise, if the small primitive rasterization mode is selected, rasterization mode selector 36 may provide the processed primitive information to fragment processing block 40 for rasterization and instruct fragment processing block 40 to perform one or more rasterization operations for the primitive. In some cases, rasterization mode selector 36 may also instruct rasterization block 38 not to rasterize the primitive if the small primitive rasterization mode is selected, and instruct rasterization block 38 to rasterize the primitive if the large primitive rasterization mode is selected. Rasterization mode selector 36 may send instructions to rasterization block 38 and/or fragment processing block 40 via one or more control signals.

In some examples, rasterization mode selector 36 may select a different rasterization mode for each individual graphics primitive to be rasterized, and graphics processing pipeline 30 may rasterize each primitive according to the rasterization mode selected for the respective primitive. In other words, in such examples, the rasterization mode may be primitive-specific. For example, graphics processing pipeline 30 may be capable of rasterizing two or more primitives in a partially or fully parallel manner. In such examples, graphics processing pipeline 30 may simultaneously rasterize two or more graphics primitives according to the same rasterization mode or according to different rasterization modes. In other examples, rasterization mode selector 36 may select a single rasterization mode for all primitives within a batch of primitives or for all primitives associated with an object to be rendered. The phrase rasterization mode, as used herein, may be alternatively referred to as a rasterization technique.

Rasterization block 38 is configured to receive processed primitive information for large primitives and to perform a fixed function rasterization technique on the large primitives. The fixed function rasterization technique may convert the vertex representation of the primitive included within the processed primitive information into a fragment representation of the primitive. Rasterization block 38 provides fragment information to fragment processing block 40 for further processing. The fragment information may include fragments representative of the rasterized primitive.

The vertex representation of the primitive may include a set of one or more vertices that define the primitive or polygon to be rendered. Each vertex may correspond to a corner of a polygon where two edges of the polygon meet. In the case of a triangle polygon, the triangle may be defined by three vertices. Each vertex may be associated with a set of attributes, such as, e.g., positional coordinates, color values, a normal vector, texture coordinates. The fragment representation of the primitive may include a set of one or more fragments. Each fragment may correspond to a display screen location and be associated with color and intensity attributes. The fragment representation of the primitive may include the fragments that are covered by the primitive. The fragments that are covered by the primitive may include fragments that represent the vertices of the primitive, fragments that represent the edges of the primitive and fragments that represent the interior of the primitive.

The term fragment is used instead of pixel to distinguish that multiple fragments from different primitives may be associated with a single screen pixel. However, the terms fragment and pixel are frequently used interchangeably by those of skill in the art. As such, the term fragment in this disclosure may also mean a pixel depending on the context, and the term pixel may also refer to one or more fragments associated with the pixel depending on the context. In addition, the fragment representation of the graphics primitive, as used herein, may be alternatively referred to as a pixel representation of the graphics primitive.

Fragment processing block 40 is configured to receive fragment information and perform additional processing on the fragment information to generate pixel color values and depth information that is provided to a frame buffer. Fragment processing block 40 may perform per-fragment operations to generate one or more color values for each fragment and, in some instances, a depth value for each fragment. The per-fragment operations may include, for example, color computation, shading, texture mapping, per-pixel lighting, fog processing, blending, a stencil test, a depth test, a scissors test and/or stippling operations. Fragment processing block 40 may determine if the fragment is visible, and if so, place the resulting color values for the fragment in a frame buffer. When fragment processing block 40 receives instructions to operate in the small primitive rasterization mode, fragment processing block 40 may also be configured to receive processed primitive information from rasterization mode selector 36 and perform one or more rasterization operations on the processed primitive information to generate fragment information upon which subsequent per-fragment operations may be performed. When fragment processing block 40 receives instructions to operate in the large primitive rasterization mode, fragment processing block 40 may, in some instances, disable the performance of the rasterization operations.

Figure 4:
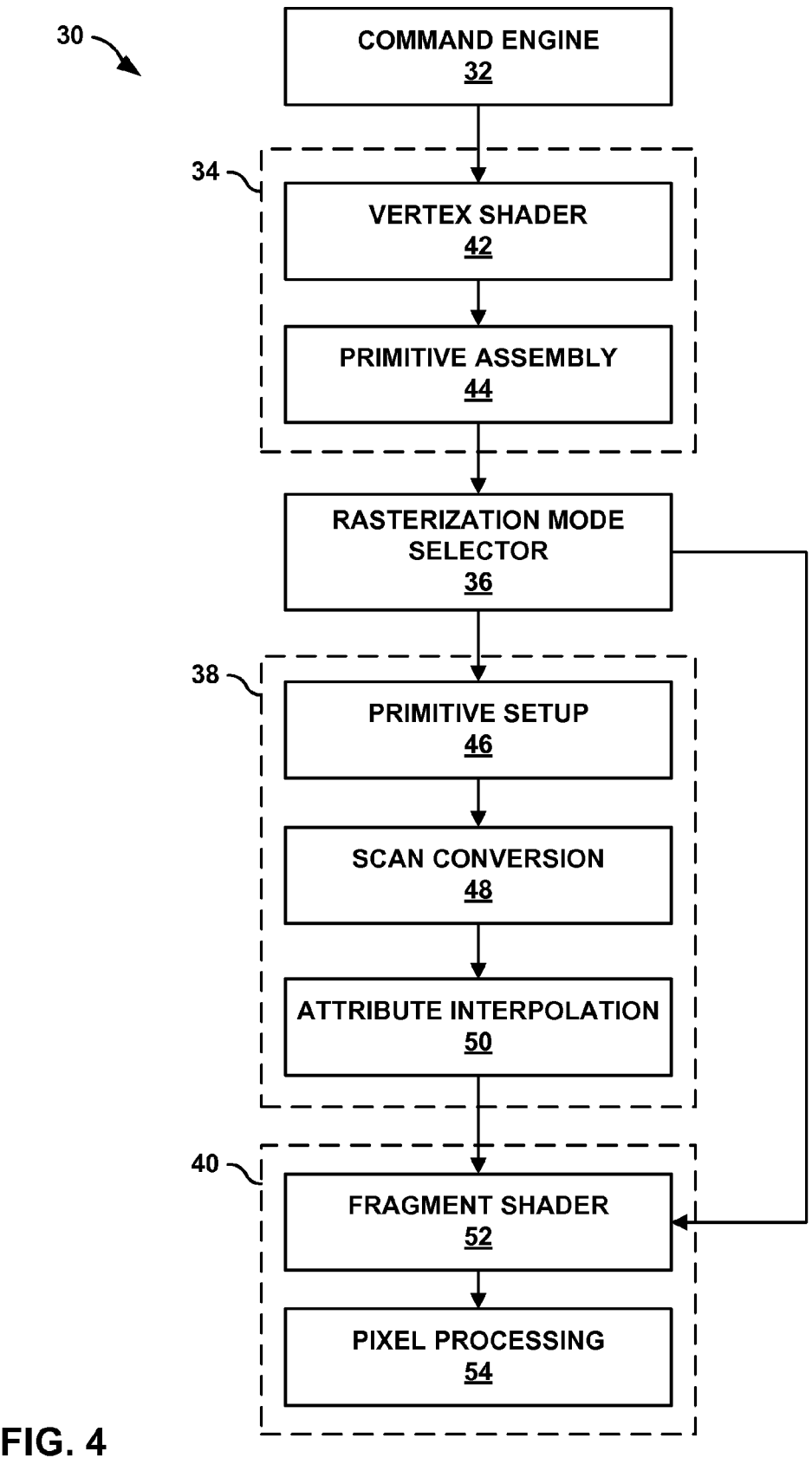
FIGS. 4 and 5 are functional block diagrams illustrating example implementations of the graphics processing pipeline shown in FIG. 3.

FIG. 4 is a functional block diagram illustrating an example implementation of the graphics processing pipeline 30 shown in FIG. 3. In particular, FIG. 4 illustrates example graphics pipeline stages that may be used to implement the pipeline stages shown in FIG. 3. The pipeline stages include a vertex shader 52 and a primitive assembly unit 44 used to implement geometry processing block 34 in FIG. 3, a primitive setup block 46, a scan conversion block 48 and an attribute interpolation block 50 used to implement rasterization block 38 in FIG. 3, and a fragment shader 52 and a pixel processing block 54 used to implement fragment processing block 40 in FIG. 3.

Vertex shader 52 is configured to receive primitive information from command engine 32, and to generate modified primitive information according to one or more vertex shader programs. The modified primitive information may include, for example, modified vertex positional coordinates, processed vertex attribute values and/or the primitive type information. Vertex shader 52 may perform one or more transformations on the vertex positional coordinates included within the primitive information to produce the modified vertex positional coordinates. For example, vertex shader 52 may apply one or more of a modeling transformation, a viewing transformation, a projection transformation, a ModelView transformation, and a ModelViewProjection transformation to the vertex positional coordinates to generate the modified vertex positional coordinates. In some instances, the vertex positional coordinates may be model space coordinates, and the modified vertex positional coordinates may be clip space coordinates. The clip space coordinates may be obtained after the application of the modeling, viewing and projection transformations. In some instances, vertex shader 52 may also perform per-vertex lighting operations on the vertices to generate modified color coordinates for the vertices. Vertex shader 52 may also perform other operations including, e.g., normal transformations and normal normalization operations.

Vertex shader 52 may be a programmable shader unit that is configured to execute a vertex shader program. The shader program may be a pre-compiled program that is downloaded to the shader unit by the graphics driver prior to the processing of graphics operations. The vertex shader program may control the operation of the shader unit to perform any of the functions described above and/or additional functions. In general, each vertex processed by vertex shader 52 may be processed by a corresponding vertex shader thread of the vertex shader program. In some examples, the programmable shader unit may include a plurality of processing units that are configured to operate in parallel, e.g., an SIMD pipeline. In such examples, the processing of each vertex shader thread may occur on a separate processing unit in parallel with the other processing units.

Primitive assembly unit 44 is configured to receive modified primitive information from vertex shader 52, and to generate processed primitive information based on the modified primitive information. Primitive assembly unit 44 may perform one or more operations on the vertices within the modified primitive information to generate the processed primitive information. These operations may include, for example, view volume clipping, user-defined clipping, homogenous division, a viewport transformation and depth range scaling.

Primitive setup block 46 is configured to receive processed primitive information from rasterization mode selector 36 and to determine primitive setup data that is used by scan conversion block 48 for scan conversion of the primitive. For example, primitive setup block 46 may calculate differentials, edge functions, plane equations and/or other data that may be used by scan conversion block 48 to traverse the graphics primitive. Primitive setup block 46 may provide the primitive setup data to scan conversion block 48 for further processing. Primitive setup block 46 may be a fixed function graphics processing stage, which may be alternatively referred to herein as fixed function primitive setup hardware.

Scan conversion block 48 is configured to determine which fragments are covered by the primitive being rasterized. For example, scan conversion block 48 may execute a primitive traversal algorithm using the data provided by primitive setup block 46 to determine the fragments that are covered by the primitive. Executing the primitive traversal algorithm may include, e.g., executing an edge walking algorithm or evaluating edge equations for a plurality of candidate fragment locations. Scan conversion block 48 may provide the scan conversion information, which may include fragment positional information for the fragments covered by the primitive, to attribute interpolation block 50 for further processing. Scan conversion block 48 may be a fixed function graphics processing stage, which may be alternatively referred to herein as fixed function scan conversion hardware.

Attribute interpolation block 50 is configured to perform an attribute interpolation algorithm for each fragment covered by the primitive. The attribute interpolation algorithm may determine color values and other attributes values for a fragment based on the attribute values of the vertices associated with the primitive. Attribute interpolation block 50 may provide fragment information to fragment shader 52, which may include fragment positional information, color values and/or other attribute values resulting from the interpolation. Attribute interpolation block 50 may be a fixed function graphics processing stage, which may be alternatively referred to herein as fixed function attribute interpolation hardware.

Although FIG. 4 illustrates a rasterization block 38 that includes a fixed function attribute interpolation block 50, in other examples, rasterization block 38 may not include attribute interpolation block 50. In such examples, attribute interpolation may be performed by a shader program within fragment shader 52.

Fragment shader 52 is configured to receive the fragment information from attribute interpolation block 50 and to generate modified fragment information according to one or more fragment shader programs. Fragment shader 52 may modify the color values for each of the pixels by performing one or more shading operations and/or by performing one or more texture mapping operations. Fragment shader 52 may generate modified fragment information, which may include modified color values, and provide the modified fragment information to pixel processing block 54. When fragment shader 52 receives instructions to operate in the small primitive rasterization mode, fragment shader 52 may receive processed primitive information from rasterization mode selector 36 and perform one or more rasterization operations on the processed primitive information to generate fragment information upon which subsequent fragment shader processing may be performed.

Similar to vertex shader 52, fragment shader 52 may be a programmable shader unit that is configured to execute a fragment shader program. The shader program may be a pre-compiled program that is downloaded to the shader unit by the graphics driver prior to the processing of graphics operations. The fragment shader program may control the operation of the shader unit to perform any of the functions described above or additional functions. In general, each fragment processed by fragment shader 52 may be processed by a corresponding fragment shader thread of the fragment shader program. In some examples, the programmable shader unit may include a plurality of processing units that are configured to operate in parallel, e.g., an SIMD pipeline. In such examples, the processing of each fragment shader thread may occur on a separate processing unit in parallel with the other processing units.

In some examples, the programmable shader unit used to implement fragment shader 52 may be different than the programmable shader unit that is used to implement vertex shader 52. In further examples, the programmable shader unit used to implement fragment shader 52 may be the same as the programmable shader unit that is used to implement vertex shader 52. In such examples, the programmable shader unit may be referred to as a unified shader unit and/or unified shader subsystem.

Pixel processing block 54 is configured to receive the modified fragment information from fragment shader 52 and to perform one or more per-fragment (or per-pixel) operations on the fragments. The per-fragment operations may include, for example, per-pixel lighting, fog processing, blending, a stencil test, a depth test, a scissors test and/or stippling operations. Pixel processing block 54 may determine if the fragment is visible, and if so, place the resulting color values for the fragment in a frame buffer associated with the graphics display. The frame buffer may be used by the graphics display to control the color and intensity of pixels on the screen.

Vertex shader 52 and fragment shader 52 illustrated in the example graphics processing pipeline 30 of FIG. 4 may be programmable processing stages while command engine 32, primitive assembly unit 44, rasterization mode selector 36, primitive setup block 46, scan conversion block 48, attribute interpolation block 50 and pixel processing block 54 may be fixed function stages. It should be noted, however, that in other examples, one or more of the fixed function stages may be programmable stages or vice versa. For example, primitive assembly unit 44 may be implemented within a programmable geometry shader unit. In general, the programmable processing stages, referred to herein as programmable shader units, execute a set of program instructions within the shader unit. Such shader units may have a program memory that stores the shader program instructions and a state storage medium, e.g., a program counter register that indicates the current instruction in the program memory being executed or the next instruction to be fetched. In contrast, the fixed function processing stages include fixed function hardware that is hard-wired to perform certain functions. Although the fixed function hardware may be configurable, based on control signals for example, to perform different functions, the fixed function hardware typically does not include a program memory that is capable of receiving user-compiled programs.

According to this disclosure, rasterization mode selector 36 may be configured to select a rasterization mode for a graphics processing pipeline from a set of at least two candidate rasterization modes based on a metric indicative of an area of a graphics primitive. The set of at least two candidate rasterization modes includes a first candidate rasterization mode, e.g., a large primitive rasterization mode, and a second candidate rasterization mode, e.g., a small primitive rasterization mode. Fixed function scan conversion block 48 may be configured to perform scan conversion for the graphics primitive when the first candidate rasterization mode is selected as the rasterization mode for the graphics primitive. Programmable fragment shader unit 52 may be configured to perform scan conversion for the graphics primitive when the second candidate rasterization mode is selected as the rasterization mode for the graphics primitive.

In some examples, rasterization mode selector 36 may compare the metric indicative of the area of the graphics primitive to a threshold and select the large primitive rasterization mode as the rasterization mode for rasterization of the graphics primitive when the metric indicative of the area of the graphics primitive is greater than the threshold, and select the small primitive rasterization mode as the rasterization mode for rasterization of the graphics primitive when the metric indicative of the area of the graphics primitive is not greater than the threshold. In some instances, the threshold may be less than or equal to approximately one screen pixel.

Rasterization mode selector 36 may configure graphics processing pipeline 30 to rasterize the graphics primitive in accordance with the selected rasterization mode. In particular, graphics processing pipeline 30 may configure one or more downstream processing stages, e.g., primitive setup block 46, scan conversion block 48, attribute interpolation block 50 and/or fragment shader 52 to rasterize the graphics primitive according to the selected rasterization mode. For example, when the large primitive rasterization mode is selected, rasterization mode selector 36 may provide processed primitive information to fixed function rasterization block 38 for rasterization, and instruct fragment shader 52 not to execute shader program instructions that perform rasterization operations for the primitive. Otherwise, if the small primitive rasterization mode is selected, rasterization mode selector 36 may provide processed primitive information to fragment processing block 40 for rasterization and instruct fragment processing block 40 to execute the shader program instructions that perform the rasterization operations for the primitive.

When the large primitive rasterization mode is selected, rasterization mode selector 36 may configure graphics processing pipeline 30 such that primitive setup block 46 performs primitive setup operations for the graphics primitive, scan conversion block 48 performs scan conversion operations for the graphics primitive, and attribute interpolation block 50 performs attribute interpolations for the graphics primitive. When the small primitive rasterization mode is selected, rasterization mode selector 36 configures graphics processing pipeline 30 such that the primitive to be rasterized effectively bypasses primitive setup block 46, scan conversion block 48 and attribute interpolation block 50. To compensate for bypassing one or more of the processing stages in fixed function rasterization block 38, fragment shader 52 may execute a shader program to perform one or more rasterization operations for the small primitive rasterization mode.

In some examples, fragment shader 52 may receive vertex information, e.g., modified vertex positional coordinates and attribute values, associated with the graphics primitive to be rendered, and execute a shader program on fragment shader 52 to perform scan conversion for the graphics primitive based on the vertex information associated with the graphics primitive. The scan conversion performed by fragment shader 52 may be less complex and/or more efficient than the scan conversion performed by fixed function scan conversion block 48. For example, the scan conversion process may not necessarily need to perform a primitive traversal algorithm, such as, e.g., an edge walking algorithm. Moreover, the scan conversion performed by fragment shader 52 may not, in some instances, need to be preceded by some or all of the primitive setup operations performed by primitive setup block 46 thereby providing additional improvements in rasterization efficiency.

In additional examples, fragment shader 52 may receive fragment positional information, e.g., fragment screen coordinates, associated with the graphics primitive to be rendered, and execute a shader program on fragment shader 52 to generate attribute values, e.g., color values, for the graphics primitive based on the fragment positional information. Again, for small triangles, the algorithm executed by fragment shader 52 for the generation of the fragment attribute values may be less complex and/or more efficient than the attribute interpolation algorithm implemented by the fixed function rasterization circuitry.

In some examples, fragment shader 52 may execute two different shader programs depending on the selected rasterization mode. In such examples, rasterization mode selector 36 may configure fragment shader 52 to execute a first shader program when the large primitive rasterization mode is selected, and to execute a second shader program when the small primitive rasterization mode is selected. The second shader program may include one or more rasterization operations and the first shader program may, in some instances, not include the one or more rasterization operations. In further examples, fragment shader 52 may execute a single shader program that selectively executes different sets of instructions depending on the selected rasterization mode. For example, rasterization mode selector 36 may configure fragment shader 52 to execute a first set of shader instructions when the large primitive rasterization mode is selected, and to execute a second set of shader instructions when the small primitive rasterization mode is selected.

The set of shader instructions executed in the small primitive rasterization mode (e.g., the second set of shader instructions) may include instructions for performing one or more operations for rasterizing and/or processing small primitives. These operations may, in some examples, not be included in the set of shader instructions executed in the large primitive rasterization mode (e.g., the first set of shader instructions). For example, the one or more operations for rasterizing and/or processing small primitives may include instructions for clipping and/or scissoring of the polygon against the pixel boundaries, performing back face culling, computing edge-equations, evaluating the per-fragment attributes and texture coordinates and determining the amount of pixel covered by the polygon.

The set of shader instructions executed in the small primitive rasterization mode may also include optimizations to more efficiently evaluate the fragment color and/or attributes compared to the fixed function rasterization pipeline. For example, the shader program for the small primitive rasterization mode may omit some calculations for rasterizing small primitives that otherwise may be performed by the fixed function rasterization block 38 in order to improve performance and/or throughput. The set of shader instructions executed in the small primitive rasterization mode may also evaluate the fragment color and attributes differently compared to the large primitive rasterization mode in order to, for example, enhance image quality or reduce image aliasing. In additional examples, if a polygon normal is facing away from the light source, the set of shader instructions executed in the small primitive rasterization mode may omit lighting computations for the polygon depending on the lighting model used. If a polygon area is small (e.g., small in the z-direction), interpolation may not need to perform perspective correction, or anisotropic texture filtering if enabled.

In some examples, graphics processing pipeline 30 may include a primitive buffer (not shown) that stores a plurality of primitives. For small primitives, rasterization mode selector 36 may place the primitives in the primitive buffer prior to forwarding the primitives to fragment shader 52. After a threshold amount of graphics primitives are stored in the primitive buffer, the primitive buffer may forward the primitives to fragment shader 52 for the performance of one or more rasterization operations, e.g., primitive setup operations. The primitive buffer may be used to allow a plurality of primitives to be sent in parallel to fragment shader 52 as fragment shader 52 may, in some examples, require a plurality of primitives (e.g., 8, 16, 32, 64, etc. primitives) to be processed in parallel in a single shader core. For example, fragment shader 52 may perform primitive setup for a plurality of primitives in parallel during a single processing cycle. The number of primitives processed in parallel by fragment shader 52 may, in some examples, correspond to the number of shader ALUs that are running in parallel on a single shader core.

In further examples, graphics processing pipeline 30 may perform bin rendering or tile rendering, e.g., render an image in small pieces or tiles. For example, rasterization mode selector 36 may perform a binning pass where rasterization mode selector 36 determines which tiles each primitive contributes to or overlaps, and assign the primitive to one or more tile-specific bins based on the determination. During the binning pass, rasterization mode selector 36 may determine, calculate and/or compute an area metric associated with each primitive and store the area metric along with the primitive information in a buffer associated with the bin. Rasterization mode selector 36 may then select a rasterization mode for a set of primitives within a particular bin based on the area metrics associated with the triangles in the bin. For example, rasterization mode selector 36 may send the set of primitives to fragment shader 52 if the large rasterization mode is selected for the set of primitives or send the set of primitives to fixed function rasterization block 38 if the small rasterization mode is selected for the set of primitives.

The rasterization operations performed by the shader program executing in fragment shader 52 may be more efficient for small primitives than the rasterization performed by the processing stages within fixed function rasterization block 38. Due to the small size of the primitives, such primitives may not need the full extent of the fixed function hardware rasterization algorithms implemented by rasterization block 38 in order to produce a rasterized primitive of acceptable quality. Therefore, the small primitive rasterization techniques described in this disclosure may increase the rasterization efficiency for small primitives without necessarily producing any decrease in perceptual quality of the resulting rasterized primitives. In addition, fragment shader 52 may have a highly-parallel architecture that can be exploited for rasterizing multiple small primitives in parallel providing further efficiency improvements with respect to small primitive rasterization.

The rasterization operations performed by the shader program executing in fragment shader 52 may not produce acceptable results, in terms of quality, for the rasterization of large primitives. Therefore, rasterization mode selector 36 may utilize the fixed function rasterization block 38 processing stages to perform the rendering for large primitives. Therefore, by selectively switching between different rasterization modes based on the area of each primitive to be rendered, the efficiency of the entire rasterization process may be increased without substantially reducing the quality of the resulting image.

Figure 5:
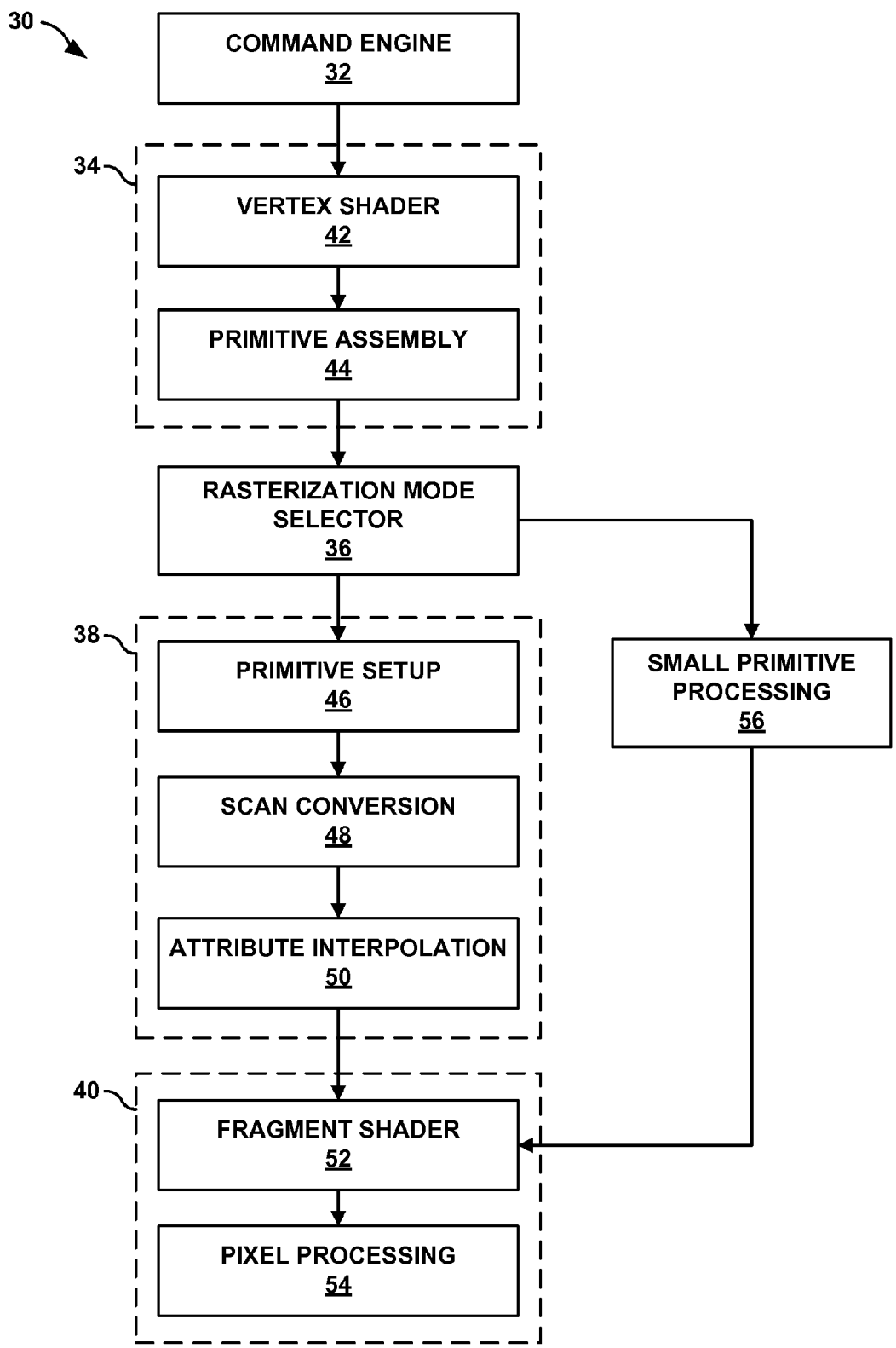

FIG. 5 is a functional block diagram illustrating another example implementation of the graphics processing pipeline 30 shown in FIG. 3. The architecture of graphics processing pipeline 30 in FIG. 5 may be substantially the same as that of graphics processing pipeline 30 shown in FIG. 4, but with the addition of primitive processing unit 56. Identically numbered components in FIGS. 4 and 5 have similar construction and functionality. Accordingly, in the interest of brevity and to avoid redundancy, the construction and operation of these shared components is not described in further detail. However, small primitive processing unit 56 is described.

When the second candidate rasterization mode is selected as the rasterization mode for the graphics primitive, small primitive processing unit 56 may receive processed primitive information from rasterization mode selector 36, and perform primitive processing on the graphics primitive to generate polygon information for the primitive. Small primitive processing unit 56 may be a fixed function processing stage, referred to herein as a fixed function primitive processing unit, that performs one or more small primitive processing algorithms to generate data that is in a more suitable form for being operated on by fragment shader 52. In examples where small primitive processing unit 56 is used, fragment shader 52 may execute a shader program on the programmable shader unit to perform scan conversion for the graphics primitive based on the polygon information.

Small primitive processing unit 56 may include fixed function hardware to perform clipping or scissoring of the polygon against the pixel boundaries, to perform back face culling, compute edge-equations, to evaluate the per-fragment attributes and texture coordinates and/or to determine the amount of pixels covered by the polygon. Small primitive processing unit 56 may also include functionality to perform primitive setup operations, to calculate differentials, edge functions, plane equations and/or other data that is used by fragment shader 52 for rasterization of the primitive. Small primitive processing unit 56 may also include functionality to determine color values and other attributes values in preparation for rasterization of the primitive by the fragment shader 52. Performing one or more rasterization operations in the dedicated hardware of small primitive processing unit 56 may free up resources in fragment shader 52 from performing operations that would otherwise be a performance bottleneck for fragment shader 52.

In some examples, fragment shader 52 may utilize small primitive processing unit 56 to assist in the performance of small primitive rasterization and/or processing operations. For example, fragment shader 52 may send one or more operations in a fragment shader program to small primitive processing unit 56 to be performed by small primitive processing unit 56 while fragment shader 52 performs other operations in the small primitive fragment shader program.

FIGS. 3-5 illustrate example graphics processing pipelines that may implement the techniques of this disclosure. Other graphics processing pipelines may be used that have the same or different components in a same or different configuration. Moreover, one or more of the processing stages illustrated in FIGS. 3-5 may be combined into a single processing stage or separated into distinct sub-stages. The processing stages may be implemented in any number of hardware units and/or circuitry. In some examples, vertex shader 52 and fragment shader 52 illustrated in FIGS. 4 and 5 may be implemented as separate programmable shader units, e.g., a vertex shader unit and a fragment shader unit. In further examples, vertex shader 52 and fragment shader 52 illustrated in FIGS. 4 and 5 may be implemented together as part of a unified shader unit.

Figure 6:
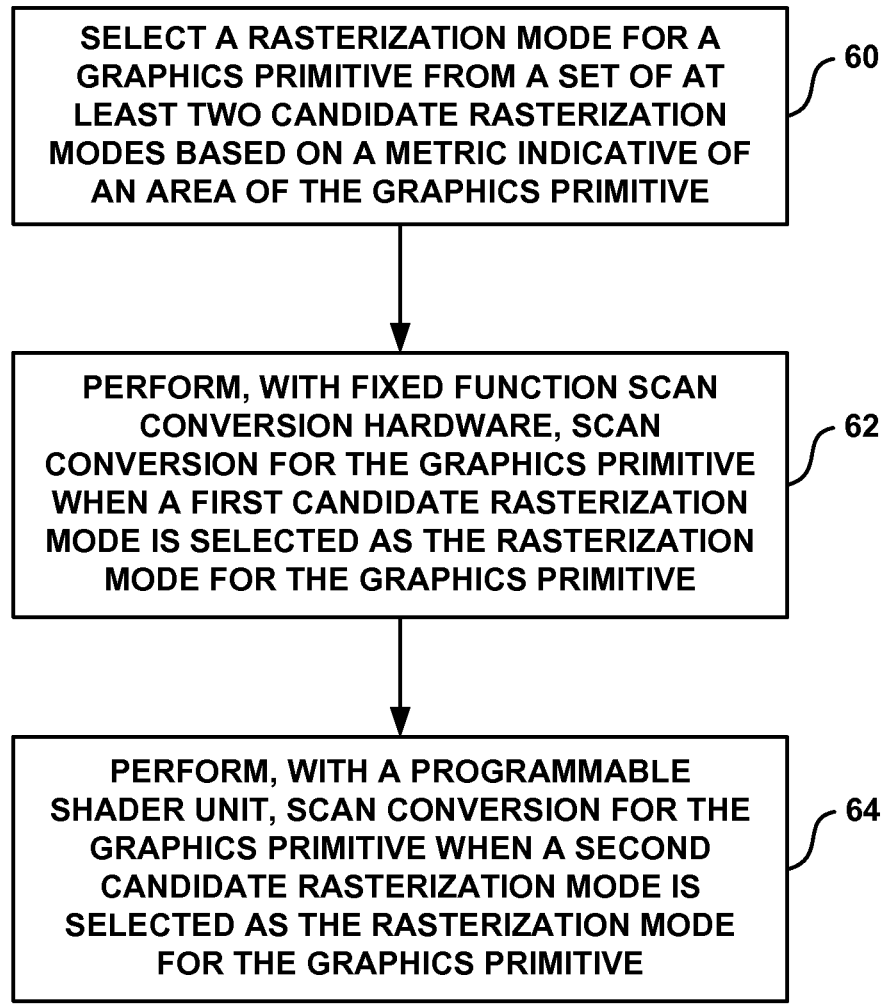
FIGS. 6 and 7 are flow diagrams illustrating example area-based rasterization techniques according to this disclosure.

FIG. 6 is a flow diagram illustrating an example area-based rasterization technique according to this disclosure. The technique may be implemented, in some examples, in any of the graphics processing pipelines described in this disclosure. Rasterization mode selector 36 selects a rasterization mode for a graphics primitive from a set of at least two candidate rasterization modes based on a metric indicative of an area of a graphics primitive (60). Graphics processing pipeline 30 performs, with scan conversion block 48 of graphics processing pipeline 30, scan conversion for the graphics primitive when a first candidate rasterization mode is selected as the rasterization mode for the graphics primitive (62). Graphics processing pipeline 30 performs, with fragment shader 52 of scan conversion block 48, scan conversion for the graphics primitive when a second candidate rasterization mode is selected as the rasterization mode for the graphics primitive (64).

Figure 7:
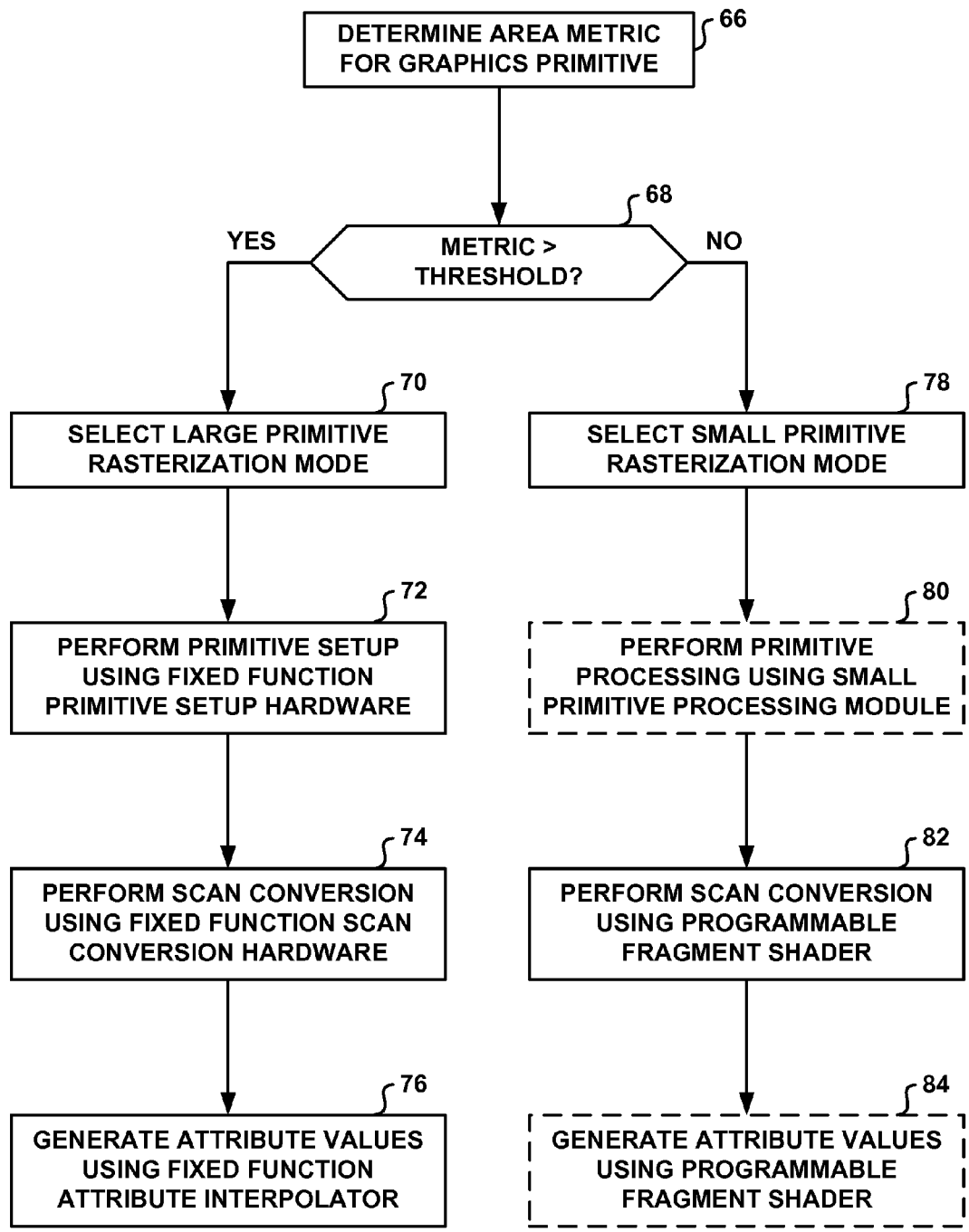

FIG. 7 is a flow diagram illustrating another example area-based rasterization technique according to this disclosure. The technique may be implemented, in some examples, in any of the graphics processing pipelines described in this disclosure. Rasterization mode selector 36 determines a metric indicative of area of a graphics primitive to be rendered (66). Rasterization mode selector 36 determines whether the metric is greater than the threshold (68). In some examples, the threshold may be less than or equal to approximately one screen pixel.

If the metric is greater than the threshold, rasterization mode selector 36 selects the large primitive rasterization mode as the rasterization mode for rasterization of the primitive (70). When rasterizing according to the large primitive rasterization mode, graphics processing pipeline 30 performs primitive setup using fixed function primitive setup hardware 46 (72). Graphics processing pipeline 30 performs scan conversion using fixed function scan conversion hardware 48 (73). Graphics processing pipeline 30 generates attribute values using fixed function attribute interpolation hardware 50 (76). In some examples, instead of performing attribute interpolation with fixed function attribute interpolation hardware 50, fragment shader 52 may be used to perform attribute interpolation.

If the metric is not greater than the threshold, rasterization mode selector 36 selects the small primitive rasterization mode as the rasterization mode for rasterization of the primitive (78). When rasterizing according to the small primitive rasterization mode, graphics processing pipeline 30 optionally performs primitive processing using small primitive processing unit 56 (80). Graphics processing pipeline 30 performs scan conversion using programmable fragment shader unit 52 (82). Graphics processing pipeline 30 optionally generates attribute values for the fragments using programmable fragment shader unit 52 (84).

The techniques described in this disclosure may be implemented, at least in part, in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects and examples have been described. However, modifications can be made to the structure or techniques of this disclosure without departing from the scope of the following claims.

The invention claimed is:

1. A method comprising:
    selecting, with a graphics processing unit (GPU), a rasterization mode for a graphics primitive from a set of at least two candidate rasterization modes based on a metric indicative of an area of the graphics primitive, the set of at least two candidate rasterization modes including a first candidate rasterization mode and a second candidate rasterization mode;
    performing, with fixed function scan conversion hardware of the GPU, scan conversion for the graphics primitive when the first candidate rasterization mode is selected as the rasterization mode for the graphics primitive; and
    performing, with a programmable shader unit of the GPU, scan conversion for the graphics primitive when the second candidate rasterization mode is selected as the rasterization mode for the graphics primitive, wherein the programmable shader unit is configured to scan convert multiple primitives in parallel.

2. The method of claim 1, wherein selecting the rasterization mode comprises:
    selecting the first candidate rasterization mode as the rasterization mode for the graphics primitive when the metric indicative of the area of the graphics primitive is greater than a threshold; and
    selecting the second candidate rasterization mode as the rasterization mode for the graphics primitive when the metric indicative of the area of the graphics primitive is not greater than the threshold.

3. The method of claim 2, wherein the threshold is less than or equal to approximately one screen pixel.

4. The method of claim 1, wherein performing, with the programmable shader unit, scan conversion for the graphics primitive comprises:
    receiving, with the programmable shader unit, vertex information associated with the graphics primitive; and executing a shader program on the programmable shader unit to perform scan conversion for the graphics primitive based on the vertex information associated with the graphics primitive.

5. The method of claim 1, further comprising:
performing, with a fixed function primitive processing unit, primitive processing on the graphics primitive to generate polygon information when the second candidate rasterization mode is selected as the rasterization mode for the graphics primitive,
wherein performing, with the programmable shader unit, scan conversion for the graphics primitive comprises executing a shader program on the programmable shader unit to perform scan conversion for the graphics primitive based on the polygon information.

6. The method of claim 1, further comprising:
executing a first set of shader program instructions on the programmable shader unit when the first candidate rasterization mode is selected as the rasterization mode for the graphics primitive; and
executing a second set of shader program instructions on the programmable shader unit when the second candidate rasterization mode is selected as the rasterization mode for the graphics primitive, the second set of shader program instructions being different than the first set of shader program instructions.

7. The method of claim 1, further comprising:
bypassing the fixed function scan conversion hardware when the second candidate rasterization mode is selected as the rasterization mode for the graphics primitive.

8. The method of claim 7, further comprising:
performing, with fixed function primitive setup hardware, primitive setup operations for the graphics primitive when the first candidate rasterization mode is selected as the rasterization mode for the graphics primitive; and
bypassing the fixed function primitive setup hardware when the second candidate rasterization mode is selected as the rasterization mode for the graphics primitive.

9. The method of claim 7, further comprising:
performing, with fixed function attribute interpolation hardware, attribute interpolation for the graphics primitive when the first candidate rasterization mode is selected as the rasterization mode for the graphics primitive; and
bypassing the fixed function attribute interpolation hardware when the second candidate rasterization mode is selected as the rasterization mode for the graphics primitive.

10. The method of claim 1, wherein the metric indicative of the area of the graphics primitive is a metric indicative of the area of the graphics primitive in terms of screen pixels.

11. The method of claim 1, further comprising:
determining the metric indicative of the area of the graphics primitive in terms of screen pixels based on vertex positional coordinates associated with the graphics primitive.

12. The method of claim 1, further comprising:
generating a bounding box around the graphics primitive, wherein the metric indicative of the area of the graphics primitive is a metric indicative of the area of the bounding box.

13. The method of claim 1, wherein the graphics primitive is a triangle primitive.

14. The method of claim 1, wherein selecting the rasterization mode for the graphics primitive comprises:
selecting a rasterization mode for a batch of graphics primitives from the set of the at least two candidate rasterization modes based on a metric indicative of an area of at least one graphics primitive in the batch of graphics primitives.

15. The method of claim 1, wherein selecting the rasterization mode for the graphics primitive comprises:
selecting a rasterization mode for a set of graphics primitives associated with an object to be rendered from the set of the at least two candidate rasterization modes based on a metric indicative of an area of at least one graphics primitive associated with the object to be rendered.

16. A graphics processing device comprising:
a rasterization mode selector configured to select a rasterization mode for a graphics primitive from a set of at least two candidate rasterization modes based on a metric indicative of an area of the graphics primitive, the set of at least two candidate rasterization modes including a first candidate rasterization mode and a second candidate rasterization mode;
fixed function scan conversion hardware configured to perform scan conversion for the graphics primitive when the first candidate rasterization mode is selected as the rasterization mode for the graphics primitive; and
a programmable shader unit configured to perform scan conversion for the graphics primitive when the second candidate rasterization mode is selected as the rasterization mode for the graphics primitive, wherein the programmable shader unit is configured to scan convert multiple primitives in parallel.

17. The device of claim 16, wherein the rasterization mode selector is further configured to select the first candidate rasterization mode as the rasterization mode for the graphics primitive when the metric indicative of the area of the graphics primitive is greater than a threshold, and select the second candidate rasterization mode as the rasterization mode for the graphics primitive when the metric indicative of the area of the graphics primitive is not greater than the threshold.

18. The device of claim 17, wherein the threshold is less than or equal to approximately one screen pixel.

19. The device of claim 16, wherein the programmable shader unit is further configured to receive vertex information associated with the graphics primitive, and execute a shader program to perform scan conversion for the graphics primitive based on the vertex information associated with the graphics primitive.

20. The device of claim 16, further comprising:
a fixed function primitive processing unit configured to perform primitive processing on the graphics primitive to generate polygon information when the second candidate rasterization mode is selected as the rasterization mode for the graphics primitive,
wherein the programmable shader unit is further configured to execute a shader program on the programmable shader unit to perform scan conversion for the graphics primitive based on the polygon information.

21. The device of claim 16, wherein the programmable shader unit is further configured to execute a first set of shader program instructions when the first candidate rasterization mode is selected as the rasterization mode for the graphics primitive, and execute a second set of shader program instructions when the second candidate rasterization mode is selected as the rasterization mode for the graphics primitive, the second set of shader program instructions being different than the first set of shader program instructions.

22. The device of claim 16, wherein the graphics processing device is configured to bypass the fixed function scan conversion hardware when the second candidate rasterization mode is selected as the rasterization mode for the graphics primitive.

23. The device of claim 22, further comprising:
fixed function primitive setup hardware configured to perform primitive setup operations for the graphics primitive when the first candidate rasterization mode is selected as the rasterization mode for the graphics primitive,
wherein the graphics processing device is further configured to bypass the fixed function primitive setup hardware when the second candidate rasterization mode is selected as the rasterization mode for the graphics primitive.

24. The device of claim 22, further comprising
fixed function attribute interpolation hardware configured to perform attribute interpolation for the graphics primitive when the first candidate rasterization mode is selected as the rasterization mode for the graphics primitive,
wherein the graphics processing device is further configured to bypass the fixed function attribute interpolation hardware when the second candidate rasterization mode is selected as the rasterization mode for the graphics primitive.

25. The device of claim 16, wherein the metric indicative of the area of the graphics primitive is a metric indicative of the area of the graphics primitive in terms of screen pixels.

26. The device of claim 16, wherein the rasterization mode selector is further configured to determine the metric indicative of the area of the graphics primitive in terms of screen pixels based on vertex positional coordinates associated with the graphics primitive.

27. The device of claim 16, wherein the rasterization mode selector is further configured to generate a bounding box around the graphics primitive, and wherein the metric indicative of the area of the graphics primitive is a metric indicative of the area of the bounding box.

28. The device of claim 16, wherein the graphics primitive is a triangle primitive.

29. The device of claim 16, further comprising a display configured to display graphics images.

30. The device of claim 16, wherein rasterization mode selector is further configured to select the rasterization mode for a batch of graphics primitives from the set of the at least two candidate rasterization modes based on a metric indicative of an area of at least one graphics primitive in the batch of graphics primitives.

31. The device of claim 16, wherein rasterization mode selector is further configured to select a rasterization mode for a set of graphics primitives associated with an object to be rendered from the set of the at least two candidate rasterization modes based on a metric indicative of an area of at least one graphics primitive associated with the object to be rendered.

32. An apparatus comprising:
means for selecting a rasterization mode for a graphics primitive from a set of at least two candidate rasterization modes based on a metric indicative of an area of the graphics primitive, the set of at least two candidate rasterization modes including a first candidate rasterization mode and a second candidate rasterization mode;
means for performing scan conversion for the graphics primitive, with fixed function scan conversion hardware, when the first candidate rasterization mode is selected as the rasterization mode for the graphics primitive; and
means for performing scan conversion for the graphics primitive, with a programmable shader unit, when the second candidate rasterization mode is selected as the rasterization mode for the graphics primitive, wherein the programmable shader unit is configured to scan convert multiple primitives in parallel.

33. The apparatus of claim 32, further comprising:
means for executing a first set of shader program instructions on the programmable shader unit when the first candidate rasterization mode is selected as the rasterization mode for the graphics primitive; and
means for executing a second set of shader program instructions on the programmable shader unit when the second candidate rasterization mode is selected as the rasterization mode for the graphics primitive, the second set of shader program instructions being different than the first set of shader program instructions.

34. The apparatus of claim 32, further comprising:
means for bypassing the fixed function scan conversion hardware when the second candidate rasterization mode is selected as the rasterization mode for the graphics primitive.

35. The apparatus of claim 32, wherein the graphics primitive is a triangle primitive.

36. A non-transitory computer-readable medium comprising instructions that cause one or more processors to:
select a rasterization mode for a graphics processor for a graphics primitive from a set of at least two candidate rasterization modes based on a metric indicative of an area of the graphics primitive, the set of at least two candidate rasterization modes including a first candidate rasterization mode and a second candidate rasterization mode;
perform scan conversion for the graphics primitive, with fixed function scan conversion hardware of the graphics processor, when the first candidate rasterization mode is selected as the rasterization mode for the graphics primitive; and
perform scan conversion for the graphics primitive, with a programmable shader unit of the graphics processor, when the second candidate rasterization mode is selected as the rasterization mode for the graphics primitive, wherein the programmable shader unit is configured to scan convert multiple primitives in parallel.

37. The non-transitory computer readable medium of claim 36, further comprising the instructions that cause the one or more processors to:
execute a first set of shader program instructions on the programmable shader unit when the first candidate rasterization mode is selected as the rasterization mode for the graphics primitive; and
execute a second set of shader program instructions on the programmable shader unit when the second candidate rasterization mode is selected as the rasterization mode for the graphics primitive, the second set of shader program instructions being different than the first set of shader program instructions.

38. The non-transitory computer readable medium of claim 36, further comprising instructions that cause the one or more processors to:
bypass the fixed function scan conversion hardware when the second candidate rasterization mode is selected as the rasterization mode for the graphics primitive.

39. The non-transitory computer readable medium of claim 36, wherein the graphics primitive is a triangle primitive.

* * * * *